United States Patent
Chen et al.

(10) Patent No.: US 8,374,833 B2
(45) Date of Patent: Feb. 12, 2013

(54) HYBRID ELEMENT ENABLING SOLID/SPH COUPLING EFFECT

(75) Inventors: Hao Chen, Pleasanton, CA (US); Jingxiao Xu, Dublin, CA (US); Chi-Hsien Wang, Pleasanton, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 498 days.

(21) Appl. No.: 12/815,112

(22) Filed: Jun. 14, 2010

(65) Prior Publication Data
US 2011/0077912 A1 Mar. 31, 2011

Related U.S. Application Data

(66) Substitute for application No. 61/348,608, filed on May 26, 2010.

(51) Int. Cl.
*G06G 7/48* (2006.01)
(52) U.S. Cl. .......................................... 703/6
(58) Field of Classification Search .................. 703/1, 2, 703/6, 7, 9
See application file for complete search history.

(56) References Cited

U.S. PATENT DOCUMENTS

2009/0228246 A1* 9/2009 Lacome ............................. 703/2
2011/0112800 A1* 5/2011 Kim et al. ........................ 703/1

OTHER PUBLICATIONS

Wang et al., "A full coupled numerical analysis approach for buried structures sujected to subsurface blast", Computers & Structures, 2005.*
Wang et al., Development of a mesoscopic particle model for synthesis of uranium-ceramic nuclear fuel, Intl. journal of heat and mass transfer, 2009.*
Razvan, R., "Some remarks on the history of fracture mechanics", Intl. conference on Applied mathematics, simulation, modeling, 2009.*
Mahadevan et al., "Analysis of cold rigid-plastic axisymmetric forging problem by radial basis function collocation method", Intl. Journal of Advanced Manufacturing Technology, 2007.*
Sze et al., "Stabilized conforming nodal integration: exactness and variational justification", Finite eements in ananlysis and design, 2004.*
Yuan et al., "Multiscale model on deposition behavior of agglomerate metal particles in a low-temperature high-velocity air fule spraying process", Journal of Thermal Spray Technology, 2009.*
An algorithm to automatically convert distorted finite elements into meshless particles during dynamic deformation, Gordon R. Johnson et al., International Journal of Impact Engineering 27 (2002) 997-1013.
Conversion of 3D distorted elements into meshless particles during dynamic deformation, Gordon R. Johnson et al., International Journal of Impact Engineering 28 (2003) 947-966.
Extended European Search Report—EPO Application No. 11166650.9-2224, Jul. 29, 2011.
Coupling of smooth particle hydrodynamics with the finite element method, A. W. Attaway et al., Nuclear Engineering and Design 150 (1994) 199-205.

(Continued)

*Primary Examiner* — Kandasamy Thangavelu
(74) *Attorney, Agent, or Firm* — Roger H. Chu

(57) ABSTRACT

Hybrid elements that enable coupling effects between SPH particles and FEM solid are disclosed. According to one aspect of the present invention, hybrid elements are configured to facilitate coupling effect of solid element based on finite element method (FEM) and one or more corresponding particles based on smoothed particle hydrodynamics (SPH). Hybrid elements are defined in a computer aided engineering (CAE) grid model as a buffer or interface between the SPH particles and FEM solids. For example, a portion of the grid model comprises SPH particles because the likelihood of enduring large deformation, while the rest of the model comprises FEM solid elements. Hybrid elements are placed between the solids and the particles. Each hybrid element comprises two layers: solid layer and particle layer.

13 Claims, 9 Drawing Sheets

OTHER PUBLICATIONS

Continuous blending of SPH with finite elements, Sonia Fernandez-Mendez et al. Computer and Structures 83 (2005) 1448-1458.

Integrating Mesh and Meshfree Methods for Physics-Based Fracture and Debris Cloud Simulation, Zhang et al., Eurographics Symposium on Point-Based Graphics (2006).

Coupling of meshfree methods with finite elements: Basic concepts and test results, T. Robczuk et al., Communications in Numerical Methods in Engineering, 2000; 00:1-6.

Semi-adaptive Coupling Technique for the Prediction of Impact Damage, Levent Aktay et al., VIII International Conference on Computational Plasticity, Barcelona, 2005.

* cited by examiner

US 8,374,833 B2

HYBRID ELEMENT ENABLING SOLID/SPH COUPLING EFFECT

CROSS-REFERENCE TO RELATED APPLICATIONS

This application claims priority from a co-pending U.S. Provisional Patent Application Ser. No. 61/246,971, filed on May 26, 2010.

FIELD OF THE INVENTION

The present invention generally relates to computer aided mechanical engineering analysis, more particularly to methods and systems for performing time-marching simulation of a structure experiencing large deformations (e.g., car crash or explosion simulations) using a combination of solid elements based on finite element method (FEM) and particles based on smoothed particle hydrodynamics (SPH)), at least one layer of hybrid elements is created between the solid elements and SPH particles to enable coupling effects.

BACKGROUND OF THE INVENTION

Continuum mechanics has been used for simulating continuous matter such as solids and fluids (i.e., liquids and gases). Differential equations are employed in solving problems in continuum mechanics. Many numerical procedures have been used. One of the most popular methods is finite element analysis (FEA) or finite element method (FEM), which is a computerized method widely used in industry to model and solve engineering problems relating to complex systems such as three-dimensional non-linear structural design and analysis. FEA derives its name from the manner in which the geometry of the object under consideration is specified. With the advent of the modern digital computer, FEA has been implemented as FEA software. Basically, the FEA software is provided with a grid-based model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

Once the model is defined, FEA software can be used for performing a numerical simulation of the physical behavior under the specified loading or initial conditions. FEA software is used extensively in the automotive industry to simulate front and side impacts of automobiles, occupant dummies interacting with airbags, and the forming of body parts from sheet metal. Such simulations provide valuable insight to engineers who are able to improve the safety of automobiles and to bring new models to the market more quickly. The simulation is performed in time domain meaning the FEA is computed at many solution cycles starting from an initial solution cycle, at each subsequent solution cycle, the simulation time is incremented by a time step referred to as $\Delta T$. Such simulation is referred to as time-marching simulation.

One of the most challenging FEA tasks is to simulate an impact event involving a structure undergoing very large deformation, for example, car crash or explosion simulations. As the modern computer improves, engineers not only wish to simulate the behavior in an impact event with structural failure, they also want to simulate structural behaviors after yielding before total failure from an impact event. However, it is difficult to simulate such phenomena with FEA using solid elements. For example, solid elements representing foam material of a bumper may be squeezed or compressed to become too distorted or squished thereby resulting into zero or negative volume, which causes numerical problem in the simulation (e.g., simulated aborted due to invalid number in a digital computer).

To solve the zero or negative volume problem, those failed solid elements are replaced with particles under smoothed particle hydrodynamics (SPH). However, mathematical formulations of the FEM and SPH are different. In order to have particles and solid elements coexist in the same of model, some kind of connections must be established to connect the particles and the solid elements. Prior art approach has been using a tied interface, which rigidly connects certain particles with solid elements. However, this approach generally leads to very unrealistic simulated results due to arbitrary placement of tied interfaces (i.e., rigid links). For example, particles and solid elements are tied together could be reasonable initially. But, as they deform in an unpredictable manner, arbitrary placement of these rigid links might result in a very unrealistic connections.

Therefore, it would be desirable to have a more realistic interfaces in a computer aided engineering analysis model such that SPH particles and FEM solids can coexist to avoid problems and shortcomings of the prior art approaches.

SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Hybrid elements that enable coupling effects between SPH particles and FEM solid are disclosed. According to one aspect of the present invention, hybrid elements are configured to facilitate coupling effect of solid element based on finite element method (FEM) and one or more corresponding particles based on smoothed particle hydrodynamics (SPH). Hybrid elements are defined in a computer aided engineering (CAE) grid model as a buffer or interface between the SPH particles and FEM solids. For example, a portion of the grid model comprises SPH particles because the likelihood of enduring large deformation, while the rest of the model comprises FEM solid elements. Hybrid elements are placed between the solids and the particles. Each hybrid element comprises two layers: solid layer and particle layer.

First, the coupling effect of hybrid element is achieved by calculating nodal accelerations, velocities and displacements along with element stresses in the solid layer based on FEM, mapping the calculated such nodal quantities along with element stress state to the particle layer, element stress state includes stress values and current material state of the element (e.g., elastic, plastic, yielding, strain hardening, etc.), calculating internal forces in the particle layer based on SPH, and transferring the internal forces back to the solid layer to calculate nodal forces for next solution cycle.

In the following solution cycles, the nodal displacement of solid layers are updated and mapped to the corresponding SPH particles. Internal forces are calculated based on SPH and then transferred back to the solid layer to calculate nodal forces for next solution cycle.

According to another aspect of the present invention, a computer aided analysis model can comprise solid finite elements on the perimeter while SPH particles for the rest. Solid elements on the perimeter or edge are configured for facilitating boundary conditions.

According to yet another aspect, SPH particles are used for replacing solid elements that have eroded passing its yield limit. The SPH particles can be modeled with a softer material model representing strain hardening effect of the material.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-6. However, those skilled in the art will readily appreciate that the detailed description given herein with respect to these figures is for explanatory purposes as the invention extends beyond these limited embodiments.

Figure 1:
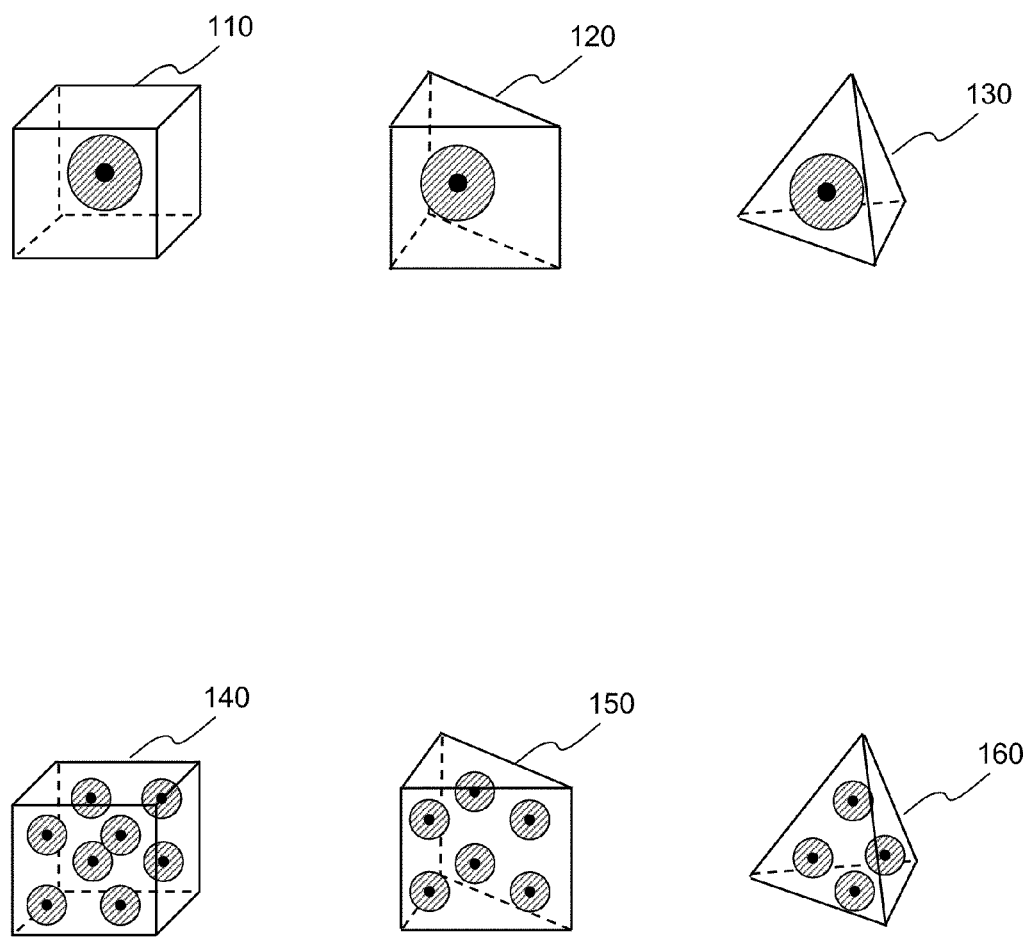
FIG. 1 is a diagram showing various exemplary hybrid elements according to an embodiment of the present invention.

Referring first to FIG. 1, it is shown a diagram of various exemplary hybrid elements in accordance with one embodiment of the present invention. Hybrid element comprises two parts: solid and corresponding particle layers. Solid layer comprises a solid element based on FEM, while corresponding particle layer comprises one or more particles based on SPH. Solid element includes, is not limited to, hexahedron, wedge and tetrahedron. Hybrid element 110 is a hexahedron with one corresponding particle, element 120 is a wedge element with one particle, and element 130 is a tetrahedron with one particle. Exemplary hybrid elements with more than one particle are shown to have 8 particles for elements 140, 6 for element 150 and 4 for element 160. Other numbers of particles can also be implemented according to another embodiment of the present invention. For example, hexahedron with 27 particles (not shown).

Coupling effect of hybrid element is achieved by correlating solid layer to the particle layer. Details of internal forces calculation procedure is illustrated in a flowchart shown in FIG. 4C. For example, solid layer serves as a constraint to particles in the corresponding particle layer. In one embodiment, volume of the solid layer is configured as a domain encompasses the particles.

Figure 2A:
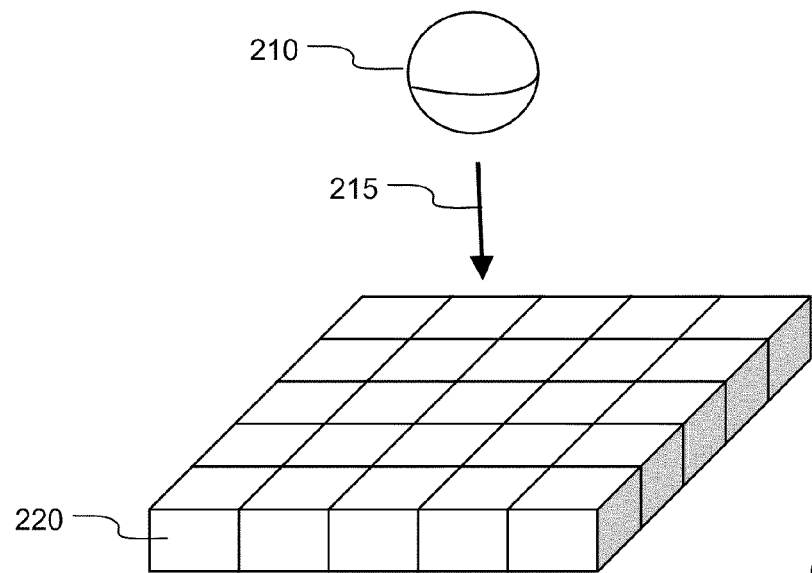
FIGS. 2A-2B are diagrams illustrating an exemplary structure subject to large deformation which can be numerically simulated with hybrid element, according to an embodiment of the present invention.
Figure 2B:
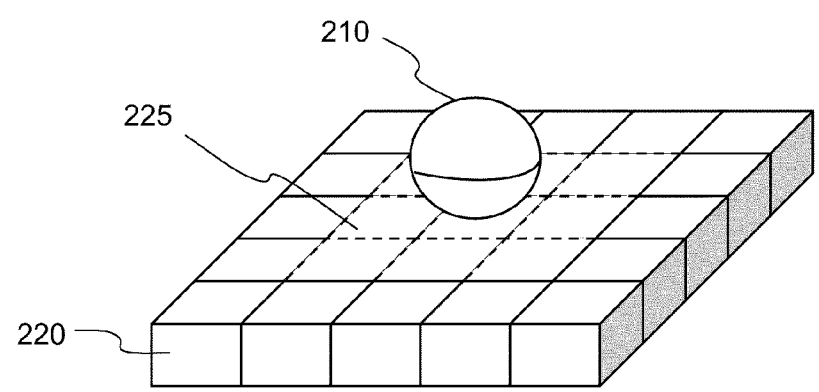
Figure 3A:
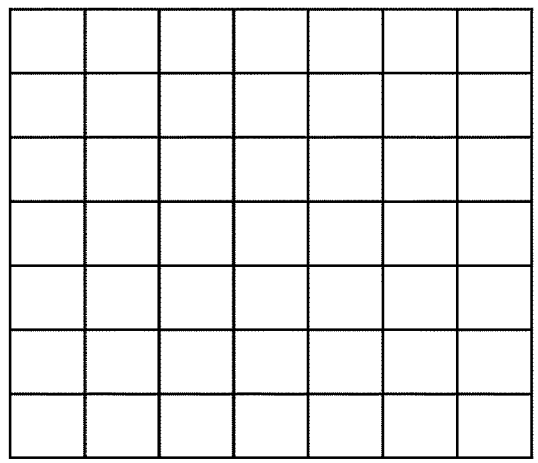
FIGS. 3A-3D are several diagrams showing an exemplary sequence of activating coupling effect of hybrid element in accordance with one embodiment of the present invention.
Figure 3B:
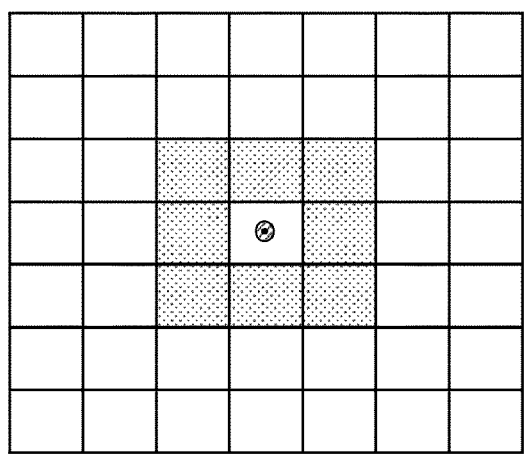
Figure 3C:
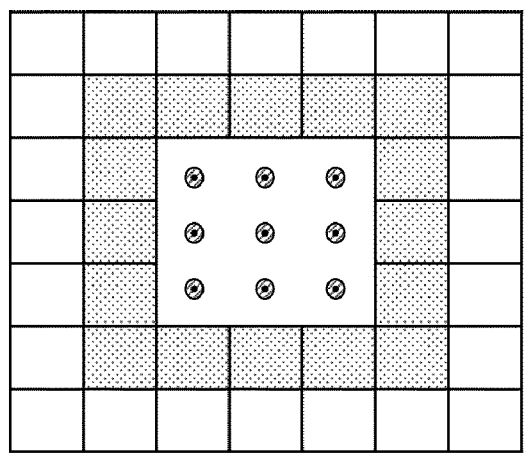
Figure 3D:
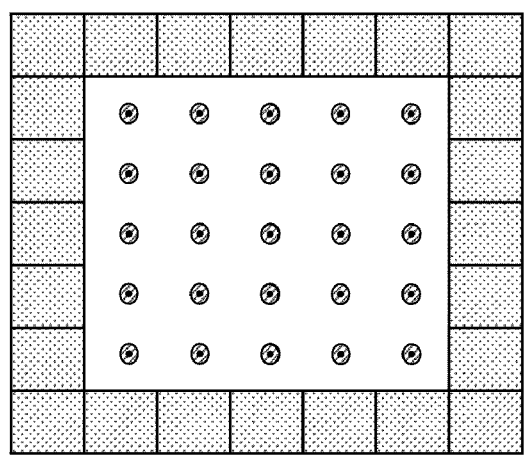

FIGS. 2A-2B shows a sequence of an object (i.e., a projectile in form of rigid ball) 210 contacting a structure (i.e., a plate partially shown as a grid model) 220 with a relative high velocity (indicated by arrow 215) thus an impulse load. Part of the structure subject to the impulse load is modeled with elements 225 (shown as dotted line). Elements 225 can be modeled with FEM solid elements initially. When the impact from the ball 210 impacts the plate 220, elements 225 may experience failure or yielding (see FIG. 4 and corresponding descriptions for definition of material failure and yielding). The failed elements are replaced with SPH particles to continue the simulation. Since SPH particles and FEM solid elements use different formulations, an interface in forms of hybrid elements are created between the SPH particles and FEM solid elements to enable coupling effect.

To further demonstrate the above example, FIGS. 3A-3D shows a sequence of plan views of the structure (plate 220). At the outset, the plate 220 is shown as all solid elements in FIG. 3A. Next, in FIG. 3B, the center solid element fails and is replaced with a SPH particle (shown as a shaded circle with a center dot). This may be caused by the projectile/ball 210 makes a hard contact with the plate 220. At least one layer of hybrid elements (shown as shaded elements) are created as an interface for coupling effect between the SPH particle and solid elements. Then more elements around the center element fail and are replaced with SPH particles in FIG. 3C. As can be seen, interface of hybrid elements is dynamically adjusted to be always located between the SPH particles and the solid elements.

Furthermore, hybrid elements can be placed on the boundary of a CAE model with SPH particles in the rest of the model. The configuration shown in FIG. 3D demonstrate this aspect of the present invention.

Figure 4:
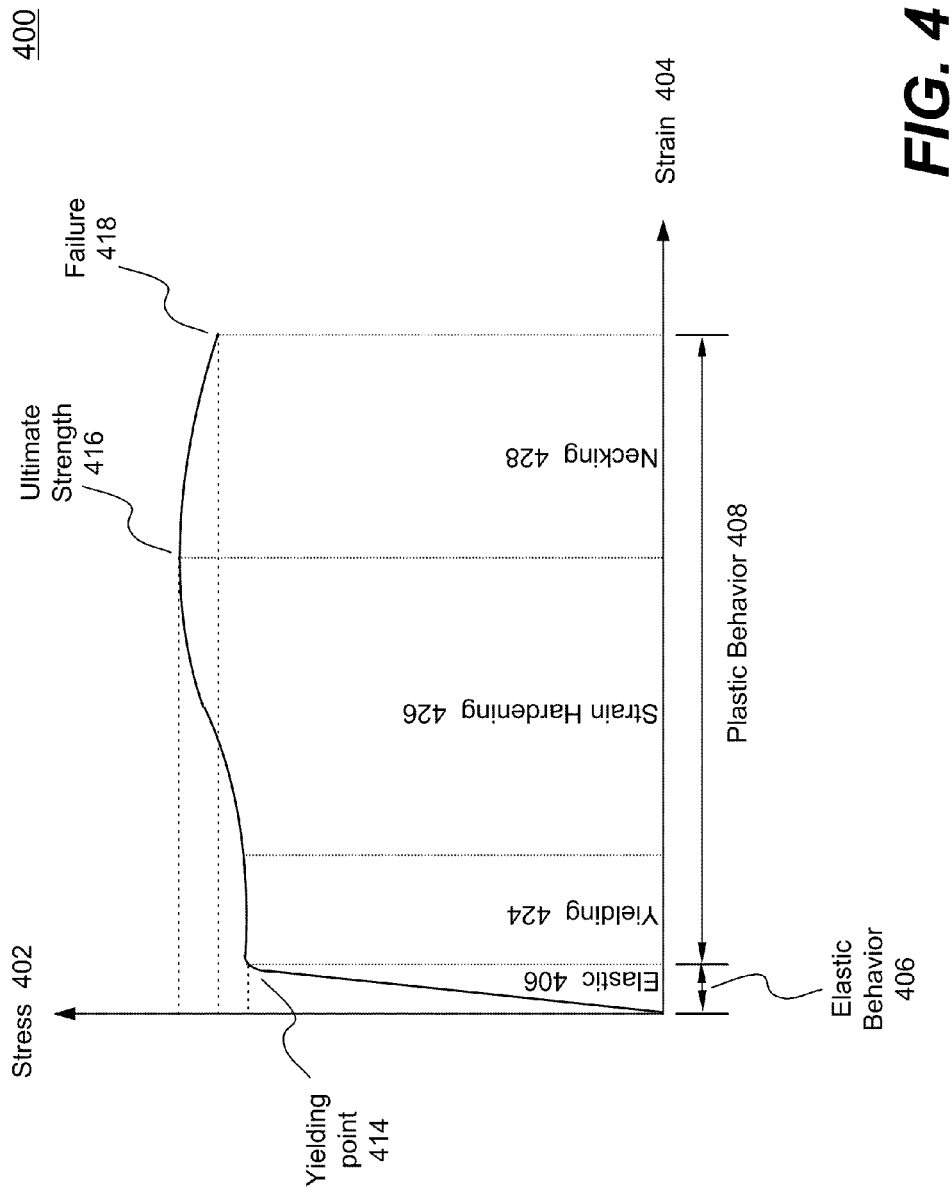
FIG. 4 is a diagram illustrating an exemplary stress-strain curve may be used for numerically simulating post-yielding structural behaviors in accordance with one embodiment of the present invention.

FIG. 4 shows an exemplary a stress-strain curve, which may be used for determining post-yielding structural behaviors in a structure, according to one embodiment of the present invention. The curve 400 has a vertical axis representing stress 402 and a horizontal axis for strain 404. Material has two regions: elastic 406 and plastic 408. Plastic region 408 is further divided into three categories: yielding 424, strain hardening 426 and necking 428. At the top end of the elastic region of the stress-strain curve 400 is a yielding point 414, to which the yielding stress corresponds. The ultimate stress corresponds to the ultimate strength point 416, while the fracture or failure stress to the failure location 418. According to one embodiment, FEM solid elements are used for modeling the elastic behavior of the material. As soon as the material goes beyond yielding, SPH particles are generated to replace the solid elements. The replaced SPH particles are modeled with softer material model so that strain hardening effect can be simulated more realistically.

Figure 5A:
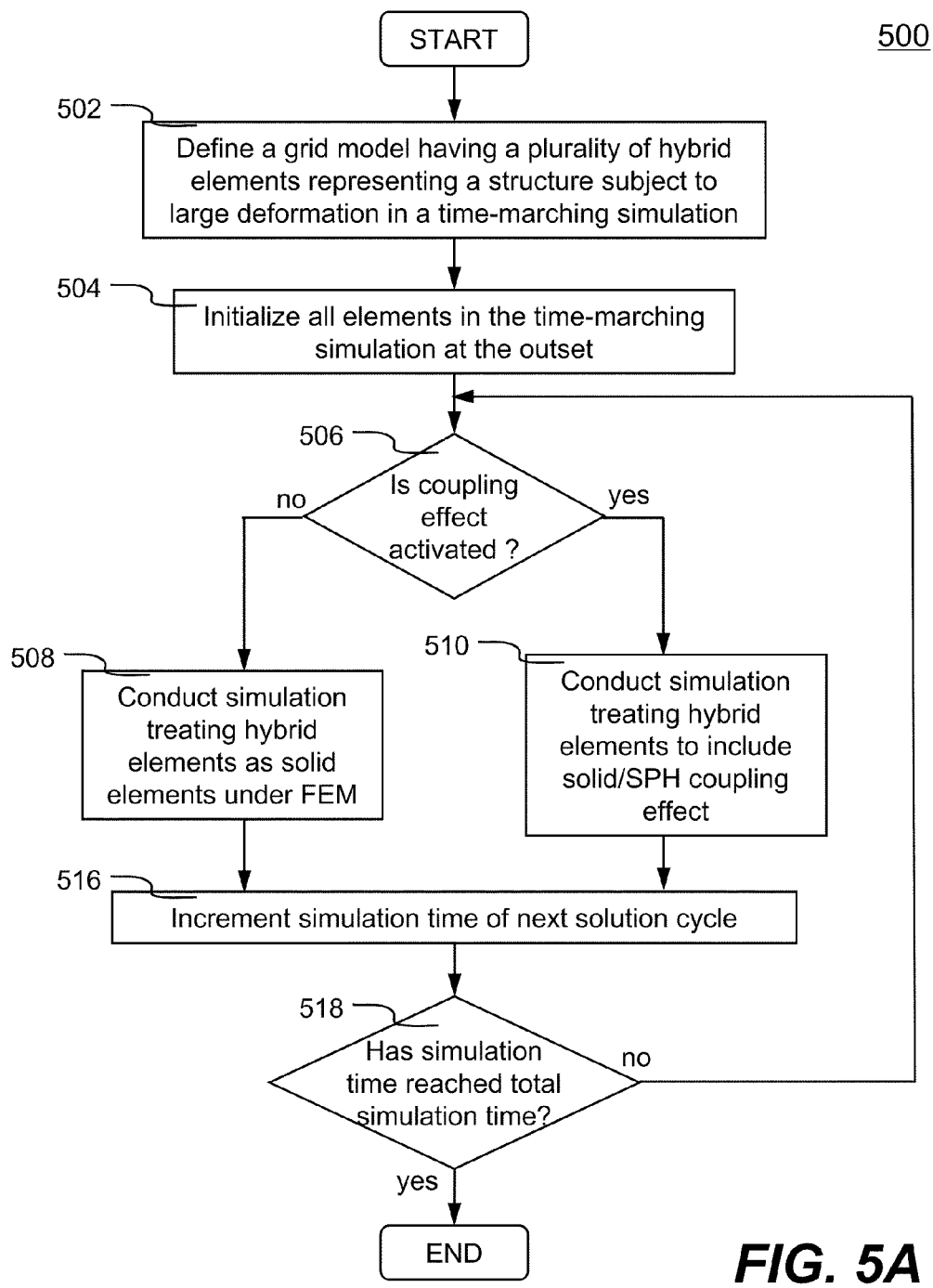
FIGS. 5A-5C collectively show a flowchart illustrating an exemplary process of using hybrid elements to numerically simulate post-yielding structural behaviors and large deformation in response to an impulse load, according to an embodiment of the present invention.

Referring now to FIG. 5A, it is shown a flowchart illustrating an exemplary process 500 of using hybrid elements to numerically simulate post-yielding structural behaviors and large deformation in response to an impulse load, according to an embodiment of the present invention. Process 500 is preferably implemented in software.

Process 500 starts by defining a computer aided analysis grid model (e.g, a FEM grid model) of a structure (e.g., car, airplane) at step 502. The grid model includes one or more hybrid elements representing part of the structure most likely subject to large deformation, for example, bumper of a car in a crash simulation. The grid model is used in a time-marching simulation. Next, at step 504, all elements and parameters are initialized in the time-marching simulation at the outset (i.e., time equal to zero, or first solution cycle). Then, process 500 checks whether coupling effect of hybrid element has been activated in decision 506. If "no", process 500 moves to step 508 to conduct simulation by treating hybrid elements as if they are solid elements under FEM. More details for step 508 are described in FIG. 5B and corresponding descriptions. In other words, the time-marching simulation is conducted using FEM if the coupling effect is not activated. Otherwise, if "yes", process 500 moves to step 510 by conducting time-marching simulation with hybrid elements to include coupling effect. FIG. 5C and associated descriptions are for step 510.

Process 500 moves to step 516 by incrementing simulation time of the next solution cycle. Then, in decision 518, it is determined whether the time-marching simulation has ended. For example, checking the simulation time against a predetermined total simulation time. If not, process 500 moves back to decision 506 to repeat the rest of steps for next solution cycle until decision 518 becomes true. Process 500 ends thereafter.

Figure 5B:
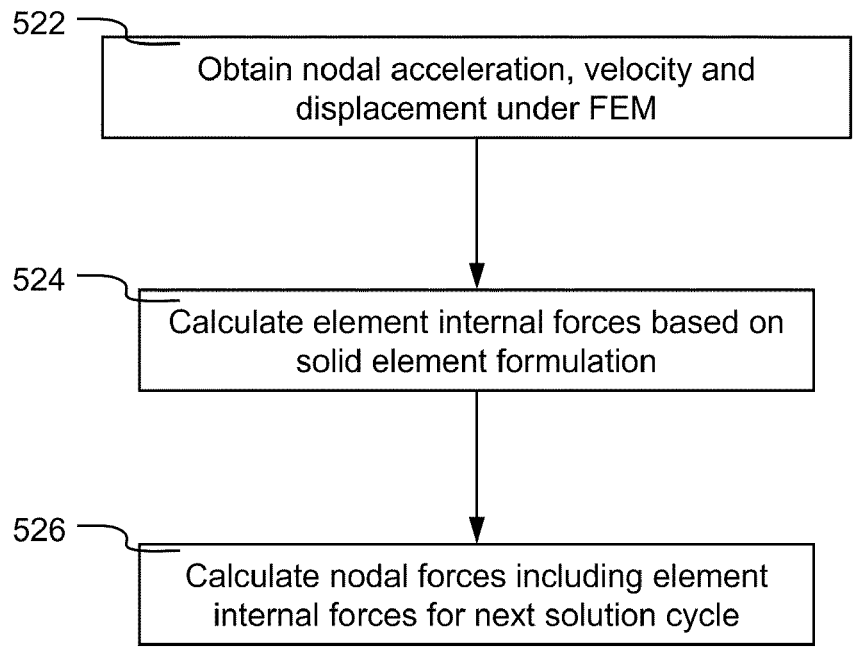
Figure 5C:
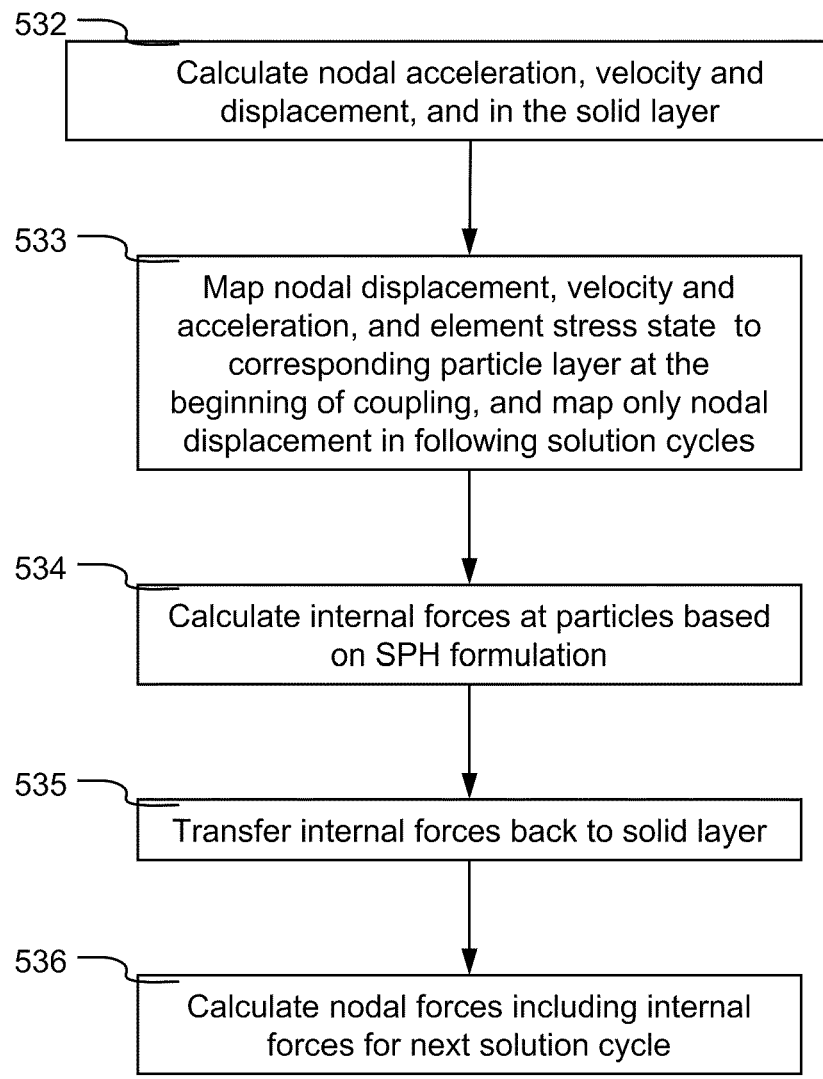

FIG. 5B shows further details of step 508. At step 522, process 500 obtains nodal accelerations, velocities and displacements of each element including hybrid elements. In one embodiment, the nodal quantities are obtained in explicit solver under FEM (e.g., f=m×a, where "f" is nodal force, "m" is nodal mass and "a" is nodal accelerations). Next, at step 524, element internal forces are calculated in accordance with solid formation under FEM. Finally, at step 526, nodal forces for next solution cycle can be calculated to include contribution from element internal forces. Any given node may receive contribution from all connected elements.

FIG. 5C shows additional details of step 510. At step 532, process obtains nodal quantities (i.e., nodal accelerations, velocities and displacements, and element stress state) in the solid layer of the hybrid element substantially similar to step 522 under FEM. Next, at step 533, the obtained nodal quantities and element state are mapped to the corresponding particle layer in the beginning of the coupling. Then in the following cycles only nodal displacements are mapped to the corresponding particle layer. Displacements of the solid layer are updated and mapped to corresponding SPH particles as constraints. In other words, SPH particles are restricted by the nodal displacements calculated based on FEM. Internal forces are calculated in the particle layer and transferred to the solid layer for calculating nodal forces based on FEM for next solution cycle. In other words, the internal forces are obtained using SPH, the internal force calculations in the solid layer is suspended in the hybrid element during these exchanges. Element stress state includes at least the stress values calculated for that element. Additionally, element stress state includes the current state of the element in an element stress state history variable. This variable or other equivalent means is used for tracking the state of the element throughout the time-marching simulation. In other words, post-yielding state of an element may be determined from the history variable of that element.

Internal force of the hybrid element is then calculated at particles in the corresponding particle layer based on SPH formulation at step 534. Next, at step 535, the internal forces are transferred back to the solid layer. In other words, element internal forces of the solid layer are substituted with those calculated from the particles in the corresponding particle layer. Finally, at step 536, nodal forces for next solution cycle are calculated including contribution of element internal forces substantially similar to step 526.

Figure 6:
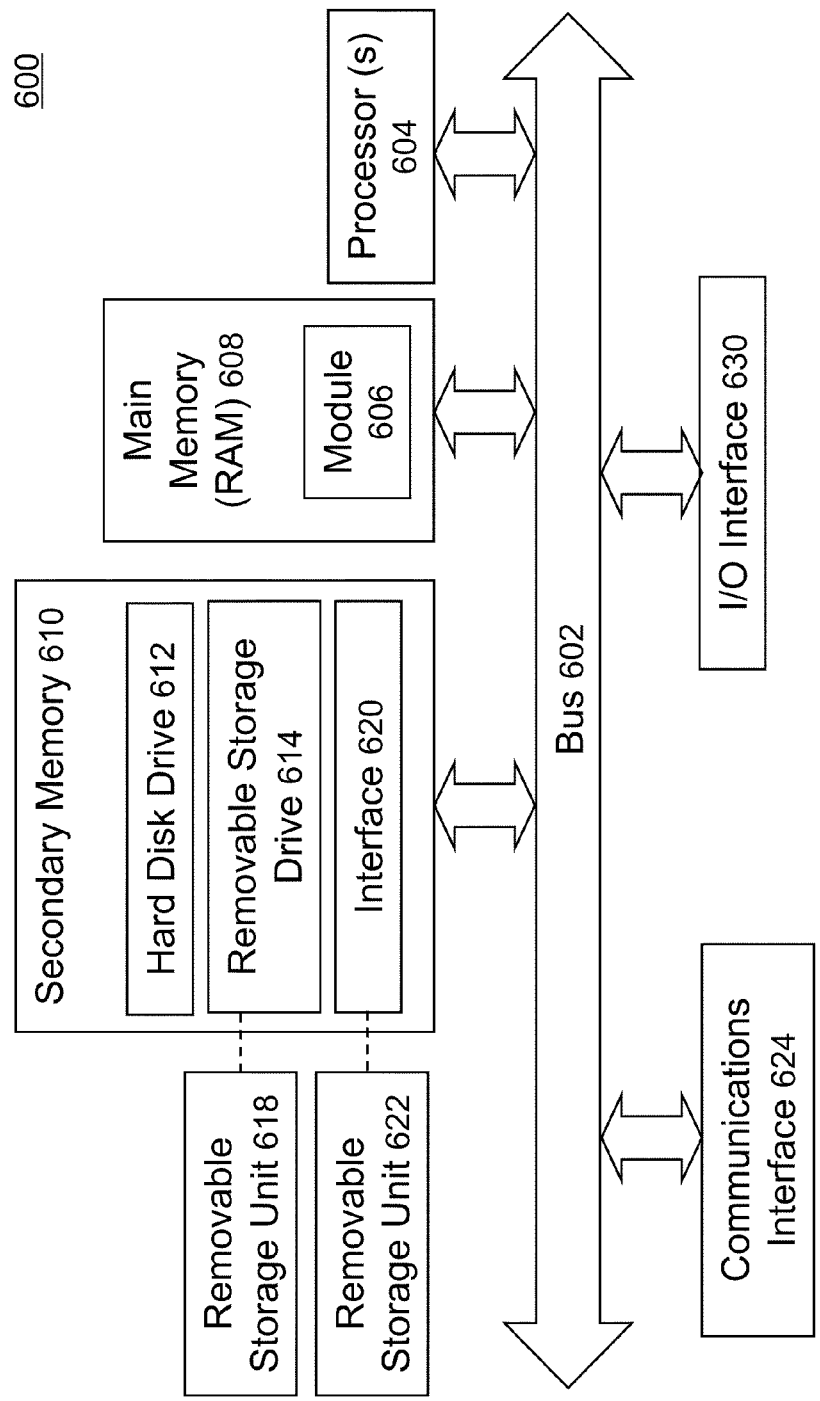
FIG. 6 is a function diagram showing salient components of a computing device, in which an embodiment of the present invention may be implemented.

According to one aspect, the present invention is directed towards one or more computer systems capable of carrying out the functionality described herein. An example of a computer system 600 is shown in FIG. 6. The computer system 600 includes one or more processors, such as processor 604. The processor 604 is connected to a computer system internal communication bus 602. Various software embodiments are described in terms of this exemplary computer system. After reading this description, it will become apparent to a person skilled in the relevant art(s) how to implement the invention using other computer systems and/or computer architectures.

Computer system 600 also includes a main memory 608, preferably random access memory (RAM), and may also include a secondary memory 610. The secondary memory 610 may include, for example, one or more hard disk drives 612 and/or one or more removable storage drives 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 622 and interfaces 620 which allow software and data to be transferred from the removable storage unit 622 to computer system 600. In general, Computer system 600 is controlled and coordinated by operating system (OS) software, which performs tasks such as process scheduling, memory management, networking and I/O services.

There may also be a communications interface 624 connecting to the bus 602. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624. The computer 600 communicates with other computing devices over a data network based on a special set of rules (i.e., a protocol). One of the common protocols is TCP/IP (Transmission Control Protocol/Internet Protocol) commonly used in the Internet. In general, the communication interface 624 manages the assembling of a data file into smaller packets that are transmitted over the data network or reassembles received packets into the original data file. In addition, the communication interface 624 handles the address part of each packet so that it gets to the right destination or intercepts packets destined for the computer 600. In this document, the terms "computer program medium", "computer readable medium", "computer recordable medium" and "computer usable medium" are used to generally refer to media such as removable storage drive 614 (e.g., flash storage drive), and/or a hard disk installed in hard disk drive 612. These computer program products are means for providing software to computer system 600. The invention is directed to such computer program products.

The computer system 600 may also include an input/output (I/O) interface 630, which provides the computer system 600 to access monitor, keyboard, mouse, printer, scanner, plotter, and alike.

Computer programs (also called computer control logic) are stored as application modules 606 in main memory 608 and/or secondary memory 610. Computer programs may also be received via communications interface 624. Such computer programs, when executed, enable the computer system 600 to perform the features of the present invention as discussed herein. In particular, the computer programs, when executed, enable the processor 604 to perform features of the present invention. Accordingly, such computer programs represent controllers of the computer system 600.

In an embodiment where the invention is implemented using software, the software may be stored in a computer program product and loaded into computer system 600 using removable storage drive 614, hard drive 612, or communications interface 624. The application module 606, when executed by the processor 604, causes the processor 604 to perform the functions of the invention as described herein.

The main memory 608 may be loaded with one or more application modules 606 (e.g., FEM and/or SPH application module) that can be executed by one or more processors 604 with or without a user input through the I/O interface 630 to achieve desired tasks. In operation, when at least one processor 604 executes one of the application modules 606, the results are computed and stored in the secondary memory 610 (i.e., hard disk drive 612). The status of the analysis is reported to the user via the I/O interface 630 either in a text or in a graphical representation upon user's instructions.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the exemplary structure subject to large deformations has been shown and described as a projectile impacting a plate, other structures under an impulse load can be numerically simulated with the claimed method of the present invention, for example, bumper of an automobile in a car crash. Additionally, whereas solid elements have been shown and described as hexahedron, wedge and tetrahedron, other types of solid elements can be used instead, for example, pentahedron. In summary, the scope of the invention should not be restricted to the specific exemplary embodiments disclosed herein, and all modifications that are readily suggested to those of ordinary skill in the art should be included within the spirit and purview of this application and scope of the appended claims.

We claim:

1. A method executed in a computer system for using hybrid elements to allow coupling effect between solid elements under finite element method (FEM) and particles under smoothed particle hydrodynamics (SPH), the method comprising:
   defining a grid model representing a structure, the grid model including a plurality of FEM solid elements, at least one SPH particle, and at least one layer of hybrid elements in between said FEM solid elements and said at least one SPH particle, each of the hybrid elements including a solid layer and a particle layer;
   performing a time-marching simulation of the structure under a loading condition using the grid model, the simulation including a coupling effect of an exchange of a set of nodal quantities calculated in the solid layer and corresponding internal forces calculated in the particle layer; and
   obtaining the time-marching simulation's results at each solution cycle, wherein the obtained results are saved into a file in a storage device and are graphically displayed to a monitor according to user's instructions.

2. The method of claim 1, wherein said exchange of said set of nodal quantities calculated in the solid layer and said corresponding internal forces in the particle layer is accomplished by:
   calculating said set of nodal quantities and an element stress state in the solid layer based on FEM;
   mapping the set of nodal quantities, and the element stress state from the solid layer to the particle layer;
   calculating said corresponding internal forces in the particle layer based on SPH; and
   transferring said corresponding internal forces to the solid layer to calculate nodal forces based on FEM for next solution cycle of the time-marching simulation.

3. The method of claim 2, wherein said set of nodal quantities comprises nodal displacements, velocities and accelerations at onset of the coupling effect.

4. The method of claim 3, wherein said set of nodal quantities comprises nodal displacements in solution cycles after the onset of the coupling effect.

5. The method of claim 4, wherein the nodal displacements are mapped to said corresponding SPH particles as constraints.

6. The method of claim 4, wherein said calculating said corresponding internal forces is suspended during said exchange.

7. The method of claim 2, wherein the particle layer includes one or more particles under SPH.

8. The method of claim 2, wherein said element stress state includes a stress state history variable that tracks each hybrid element's material state.

9. The method of claim 8, wherein said each hybrid element's material state includes post-yielding, elastic region, plastic region.

10. A system for using hybrid elements to allow coupling effect between solid elements under finite element method (FEM) and particles under smoothed particle hydrodynamics (SPH), the system comprising;
   a memory for storing computer readable code for one or more application modules;
   at least one processor coupled to the memory, said at least one processor executing the computer readable code in the memory to cause the one or more application modules to perform operations of:
   defining a grid model representing a structure, the grid model including a plurality of FEM solid elements, at least one SPH particle, and at least one layer of hybrid elements in between said FEM solid elements and said at least one SPH particle, each of the hybrid elements including a solid layer and a particle layer;
   performing a time-marching simulation of the structure under a loading condition using the grid model, the simulation including a coupling effect of an exchange of a set of nodal quantities calculated in the solid layer and corresponding internal forces calculated in the particle layer; and
   obtaining the time-marching simulation's results at each solution cycle, wherein the obtained results are saved into a file in a storage device and are graphically displayed to a monitor according to user's instructions.

11. The system of claim 10, wherein said exchange of said set of nodal quantities calculated in the solid layer and said corresponding internal forces in the particle layer is accomplished by:
   calculating said set of nodal quantities and an element stress state in the solid layer based on FEM;
   mapping the set of nodal quantities, and the element stress state from the solid layer to the particle layer;
   calculating said corresponding internal forces in the particle layer based on SPH; and
   transferring said corresponding internal forces to the solid layer to calculate nodal forces based on FEM for next solution cycle of the time-marching simulation.

12. A non-transitory computer readable medium containing instructions for controlling a computer system for using hybrid elements to allow coupling effect between solid elements under finite element method (FEM) and particles under smoothed particle hydrodynamics (SPH) by a method comprising:
   defining a grid model representing a structure, the grid model including a plurality of FEM solid elements, at least one SPH particle, and at least one layer of hybrid elements in between said FEM solid elements and said at least one SPH particle, each of the hybrid elements including a solid layer and a particle layer;
   performing a time-marching simulation of the structure under a loading condition using the grid model, the simulation including a coupling effect of an exchange of a set of nodal quantities calculated in the solid layer and corresponding internal forces calculated in the particle layer; and
   obtaining the time-marching simulation's results at each solution cycle, wherein the obtained results are saved into a file in a storage device and are graphically displayed to a monitor according to user's instructions.

13. The computer readable medium of claim 12, wherein said exchange of said set of nodal quantities calculated in the solid layer and said corresponding internal forces in the particle layer is accomplished by:
   calculating said set of nodal quantities and an element stress state in the solid layer based on FEM;
   mapping the set of nodal quantities, and the element stress state from the solid layer to the particle layer;
   calculating said corresponding internal forces in the particle layer based on SPH; and
   transferring said corresponding internal forces to the solid layer to calculate nodal forces based on FEM for next solution cycle of the time-marching simulation.

* * * * *